United States Patent
Lin (10) Patent No.: US 12,035,342 B2
(45) Date of Patent: Jul. 9, 2024

(54) APPARATUS AND METHOD OF WIRELESS COMMUNICATION OF SAME

(71) Applicant: GUANGDONG OPPO MOBILE TELECOMMUNICATIONS CORP., LTD., Dongguan (CN)

(72) Inventor: Huei-Ming Lin, Victoria (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 367 days.

(21) Appl. No.: 17/478,717

(22) Filed: Sep. 17, 2021

(65) Prior Publication Data
US 2022/0022190 A1    Jan. 20, 2022

Related U.S. Application Data (63) Continuation of application No. PCT/CN2020/079527, filed on Mar. 16, 2020.

(60) Provisional application No. 62/827,278, filed on Apr. 1, 2019.

(51) Int. Cl.
| | |
|---|---|
| *H04W 72/53* | (2023.01) |
| *H04W 72/23* | (2023.01) |
| *H04W 72/54* | (2023.01) |
| *H04W 92/18* | (2009.01) |

(52) U.S. Cl.
CPC .......... *H04W 72/53* (2023.01); *H04W 72/23* (2023.01); *H04W 72/54* (2023.01); *H04W 92/18* (2013.01)

(58) Field of Classification Search
None
See application file for complete search history.

(56) References Cited

U.S. PATENT DOCUMENTS

| | | | |
|---|---|---|---|
| 2017/0118681 A1 | 4/2017 | Rexhepi | |
| 2018/0084539 A1 | 3/2018 | Kubota et al. | |
| 2018/0219652 A1 | 8/2018 | Chen et al. | |
| 2019/0013881 A1* | 1/2019 | Olesen | ............... H04B 15/02 |
| 2019/0037448 A1 | 1/2019 | Shan et al. | |

(Continued)

FOREIGN PATENT DOCUMENTS

| | | |
|---|---|---|
| CN | 107637120 A | 1/2018 |
| CN | 108307382 A | 7/2018 |

(Continued)

OTHER PUBLICATIONS

International Search Report and Written Opinion date May 25, 2020 in International Application No. PCT/ CN2020/079527.

(Continued)

*Primary Examiner* — Phirin Sam
(74) *Attorney, Agent, or Firm* — Sheppard, Mullin, Richter & Hampton LLP (57) ABSTRACT

An apparatus and a method of wireless communication of same capable of providing good sidelink (SL) system operation performance and saving SL resources are provided. A method of wireless communication of a user equipment includes receiving, from a base station, a sidelink resource configuration signaling for more than one radio access technology (RAT) and reporting to the base station that a UE capability supports cross-RAT control. This provides good sidelink (SL) system operation performance and saving SL resources.

17 Claims, 4 Drawing Sheets

(56) References Cited

U.S. PATENT DOCUMENTS

| | | | | | |
|---|---|---|---|---|---|
| 2019/0174346 | A1* | 6/2019 | Murray | ............... | H04B 7/0408 |
| 2019/0274121 | A1* | 9/2019 | Wu | ............... | H04L 5/0092 |
| 2020/0107236 | A1* | 4/2020 | Tseng | ............... | H04W 4/40 |
| 2020/0113015 | A1 | 4/2020 | Basu Mallick et al. | | |
| 2021/0314899 | A1* | 10/2021 | Shan | ............... | H04W 60/04 |
| 2021/0392628 | A1* | 12/2021 | Wu | ............... | H04W 48/10 |
| 2022/0015070 | A1* | 1/2022 | Chen | ............... | H04W 72/23 |
| 2022/0225464 | A1* | 7/2022 | Cheng | ............... | H04W 36/03 |
| 2023/0292331 | A1* | 9/2023 | Tsai | ............... | H04B 7/0639 |

FOREIGN PATENT DOCUMENTS

| | | |
|---|---|---|
| CN | 109479292 A | 3/2019 |
| CN | 110859005 A | 3/2020 |
| CN | 110876168 A | 3/2020 |
| JP | 2018527795 A | 9/2018 |
| WO | 2016137532 A1 | 9/2016 |
| WO | 2018236635 A1 | 12/2018 |
| WO | 2019006085 A1 | 1/2019 |
| WO | 2020069668 A1 | 4/2020 |

OTHER PUBLICATIONS

Huawei et al. "The enhancement of Uu to control inter-RAT V2X sidelink", 3GPP TSG-RAN WG2 Meeting #103bis R2-1815200, Oct. 8, 2018 (Oct. 8, 2018), section 2 and 3, 4 pages.

3GPP TSG RAN WG. "Status Report to TSG", 3GPP TSG RAN meeting #83 RP-190225, Mar. 18, 2019 (Mar. 18, 2019), paragraph 5, 29 pages.

Communication pursuant to Article 94(3) EPC for European application 20783861.6 mailed Jan. 23, 2023.

First Office Action from corresponding Chinese Application No. 202111305055.X, dated Jan. 19, 2023 . English translation attached.

Examination report dated Sep. 1, 2021 received in European Patent Application No. EP20783861.6.

3GPP TR 23.786 V0.10.0 (Dec. 2018),3rd Generation Partnership Project;Technical Specification Group Services and System Aspects;Study on architecture enhancements for EPS and 5G System to support advanced V2X services (Release 16).

3GPP TSG-RAN WG2 Meeting #105 , Athens, Greece, Feb. 25-Mar. 1, 2019, R2-1900171—Discussion on Inter-RAT Control for NR-V2X.

3GPP RAN WG2 Meeting #105 Athens, Greece, Feb. 25-Mar. 1, 2019,R2-1901577 (R16 V2X SI A11421 CP MultiRAT Aspects),TP to TR 38.885 on MultiRAT CP Aspects in V2X V2X.

3GPP TSG-RAN WG2 Meeting #104 Spokane, USA, Nov. 12-16, 2018, R2-1818546,Email discussion—[103bis#35][NR/V2X] V2X agreements.

3GPP TSG-RAN WG2 #104 Spokane, WA, USA, Nov. 12-16, 2018, R2-1817951—On Inter-RAT Network Control of Sidelink.

3GPP TSG RAN WG2 Meeting #104 Spokane, USA, Nov. 12-16, 2018,R2-1816996—In-device coexistence between NR V2X and LTE V2X.

3GPP TSG-RAN WG2 Meeting #105 Athens, Greece, Feb. 25-Mar. 1, 2019, R2-1901520—Prioritization of V2X Scenarios 3 and 4.

Extended European Search Report dated Mar. 24, 2022 received in European Patent Application No. EP20783861.6.

Qualcomm Incorporated:"Co-existence aspects for NR-V2X and LTE-V2X", 3GPP Draft; R1-1811268—Co-Existence, Aspects for NR-V2X and LTE-V2X, 3rd Generation Partnership Project (3GPP) , Mobile Competence Centre ; 650 , Route Des Lucioles ; F-06921 Sophia-Antipolis Cedex ; F,vol. RAN WG1 , No. Chengdu, China, Sep. 29, 2018 (Sep. 29, 2018) , XP051518671.

Interdigital Inc: "MultiRAT CP Aspects in NR V2X", 3GPP Draft; R2-1904219 (R16 V2X WIA1146 CP Mult IRAT Aspects) , 3rd Generation Partnership Project (3GPP) , Mobile Competence Centre ; 650 , Route Des Lucioles ; F-06921 Sophia-Antipolis Cedex ; France vol. RAN WG2 , No. Xi'an, China; Apr. 8, 2019-Apr. 12, 2019, Mar. 29, 2019 (Mar. 29, 2019) , XP051693447.

Interdigital Inc: "TP to TR 38.885 on MultiRAT CP Aspects in V2X V2X", 3GPP Draft; R2-1901577 (R16 V2X SI A11421 CP Multirat Aspects) , 3rd Generation Partnership Project (3GPP) , Mobile Competence Centre ; 650 , Route Des Lucioles ; F-06921 Sophia-Antipolis Cedex ; France vol. RAN WG2 ,No. Athens , Greece; Feb. 25, 2019-Mar. 1, 2019, Feb. 15, 2019 (Feb. 15, 2019) ,XP051602932.

LG Electronics Inc:"Reporting of Sidelink UE Information for cross-RAT resource allocation", 3GPP Draft; R2-1905056 Reporting of Sidelink UE Information for Cross-RAT Resource Allocation , 3rd Generation Partnership Project (3GPP) , Mobile Competence Centre ; 650 , Route Des Lucioles ; F-06921 S , vol. RAN WG2 , No. Xian, China; Apr. 8, 2019-Apr. 12, 2019, Mar. 29, 2019 (Mar. 29, 2019) , XP051694242.

First Examination Report dated Apr. 7, 2022 received in India Patent Application No. IN202127046055.

Japanese Office Action with English Translation for JP Application 2021-556764mailed Nov. 28, 2023, 4 pages.

LG Electronics Inc. Reporting of Sidelink UE Information for cross-RAT resource allocation[online], 3GPP TSG RAN WG2 #105bis R2-1905056, Internet<URL:https://www.3gpp.org/ftp/tsg_ran/WG2_RL2/TSGR2_105bis/Docs/R2-1905056.zip>, Mar. 29, 2019, 3 pages.

Extended European Search Report dated Jan. 29, 2024 received in European Patent Application No. EP23198594.6, 14 pages.

\* cited by examiner

APPARATUS AND METHOD OF WIRELESS COMMUNICATION OF SAME

CROSS-REFERENCE TO RELATED APPLICATION

The present application is a continuation of International Application No. PCT/CN2020/079527, filed on Mar. 16, 2020, which claims priority to U.S. Patent Application No. 62/827,278, filed on Apr. 1, 2019, the content of which are incorporated herein by reference in their entireties.

BACKGROUND OF DISCLOSURE

1. Field of the Disclosure

The present disclosure relates to the field of communication systems, and more particularly, to an apparatus and a method of wireless communication of the same, which can provide good sidelink (SL) system operation performance and saving SL resources.

2. Description of the Related Art

In the evolution of vehicle-to-everything (V2X) communication for advancing intelligent transportation systems (ITSs), 3rd generation partnership project (3GPP) in Release 14 developed its first version of direct device-to-device sidelink (SL) wireless communication to support basic V2X services based on 4th generation-long term evolution (4G-LTE) radio access technology (RAT). After that, LTE-V2X is further enhanced in Release 15 to include additional features such as carrier aggregation, SL resource sensing and reporting to an LTE network base station (BS), and etc. However, due to an inherently long physical layer structure of LTE subframes, and constraints of current resource sensing and selection procedure design in LTE-V2X, 3GPP has turned its focus from further enhancing the current LTE-V2X technologies to developing a brand new sidelink communication technology based on newly released 5th generation-new radio (5G-NR) RAT, namely NR-V2X, in Release 16.

Therefore, there is a need for an apparatus and a method of wireless communication of the same, which can provide good sidelink (SL) system operation performance and saving SL resources.

SUMMARY

An object of the present disclosure is to propose an apparatus and a method of wireless communication of the same capable of providing good sidelink (SL) system operation performance and saving SL resources.

In a first aspect of the present disclosure, a user equipment for wireless communication includes a memory, a transceiver, and a processor coupled to the memory and the transceiver. The processor is configured to control the transceiver to receive, from a base station, a sidelink resource configuration signaling for more than one radio access technology (RAT) and control the transceiver to report to the base station that a UE capability supports cross-RAT control.

In a second aspect of the present disclosure, a method of wireless communication of a user equipment includes receiving, from a base station, a sidelink resource configuration signaling for more than one radio access technology (RAT) and reporting to the base station that a UE capability supports cross-RAT control.

In a third aspect of the present disclosure, a base station for wireless communication includes a memory, a transceiver, and a processor coupled to the memory and the transceiver. The processor is configured to control the transceiver to transmit, to a user equipment (UE), a sidelink resource configuration signaling for more than one radio access technology (RAT) and obtain from the UE that a UE capability supports cross-RAT control.

In a fourth aspect of the present disclosure, a method of wireless communication of a base station includes transmitting, to a user equipment (UE), a sidelink resource configuration signaling for more than one radio access technology (RAT) and obtaining from the UE that a UE capability supports cross-RAT control.

In a fifth aspect of the present disclosure, a non-transitory machine-readable storage medium has stored thereon instructions that, when executed by a computer, cause the computer to perform the above method.

In a sixth aspect of the present disclosure, a terminal device includes a processor and a memory configured to store a computer program. The processor is configured to execute the computer program stored in the memory to perform the above method.

In a seventh aspect of the present disclosure, a base station includes a processor and a memory configured to store a computer program. The processor is configured to execute the computer program stored in the memory to perform the above method.

In an eighth aspect of the present disclosure, a chip includes a processor, configured to call and run a computer program stored in a memory, to cause a device in which the chip is installed to execute the above method.

In a ninth aspect of the present disclosure, a computer readable storage medium, in which a computer program is stored, causes a computer to execute the above method.

In a tenth aspect of the present disclosure, a computer program product includes a computer program, and the computer program causes a computer to execute the above method.

In an eleventh of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Intended to be a complement to current long term evolution vehicle-to-everything (LTE-V2X) technologies, a new design of new radio V2X (NR-V2X) will interwork with LTE-V2X and target to support more advanced V2X use cases, such as autonomous driving, vehicle platooning, extended sensor sharing, and remote driving. As such, it is expected that a V2X capable UE device would be equipped with both LTE-V2X and NR-V2X sidelink communication technologies in a same UE and functioning simultaneously. However, if the UE does not report its capability of being able to operate sidelink V2X communication using both inter-radio access technologies (RATs), a network BS can only assume the UE is equipped with just one RAT, the RAT that it has been communication with the network BS over Uu uplink/downlink interface.

When the UE operates sidelink V2X communication under a network BS control, sidelink radio resources for both LTE-V2X and NR-V2X will be allocated and managed by the same BS. When the BS is a 5G-NR gNB, UE's internal NR module, which is capable of communicating with the network BS gNB via NR-Uu interface and performing NR-V2X via NR-PC5 interface, is configured to receive in downlink (DL) control signaling information messages, sidelink resource configurations and SL scheduling information for its NR-V2X transmissions and receptions. At the same time, the UE will also receive from the network BS gNB in DL equivalent control signaling information messages and SL resource configurations for its LTE-V2X transmissions and receptions. This control signaling and configuration information received in the DL by the NR module will need to pass to UE's internal LTE module for LTE-V2X operation. Similarly, when the network BS is a 4G-LTE eNB, UE's internal LTE module will be configured to receive in LTE DL control signaling information messages, sidelink resource configurations and SL scheduling information for both of its LTE-V2X and NR-V2X transmissions and receptions. Therefore, the UE internal LTE module will need to pass on all control signaling and configuration information intended for NR-V2X operations to the NR module.

Figure 1:
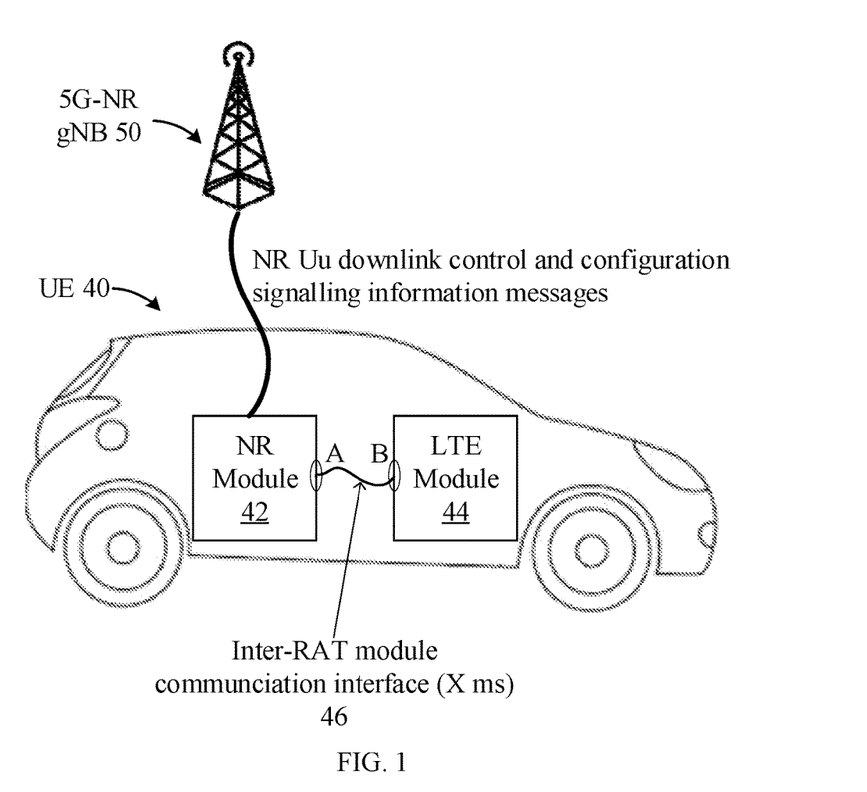
FIG. 1 is an exemplary illustration of a base station controlling a user equipment having an inter-radio access technology (inter-RAT) module communication interface.

FIG. 1 is an exemplary illustration of a base station controlling a user equipment having an inter-radio access technology (inter-RAT) module communication interface. This is exemplarily illustrated in FIG. 1, where a vehicle UE 40 is equipped with both a NR RAT module 42 and an LTE RAT module 44 to support basic and advanced V2X services and the vehicle UE 40 receives downlink control and configuration signaling information messages from a 5G-NR gNB 50. In order for the 5G-NR gNB 50 to control and schedule sidelink (SL) resources for the vehicle UE 40 to communicate using LTE-V2X, it is necessary to have inter-RAT module signaling exchange between a port A on the NR module 42 and a port B on the LTE module 44 to pass-on all related control and configuration signaling information received by the NR module 42 over a NR downlink to the LTE module 44. However, an inter-RAT module communication interface 46 between the NR module 42 and the LTE module 44 has not defined by 3GPP and therefore its latency/time duration/timing offset (e.g. X ms) that is needed for the inter-RAT module signaling exchange is not specified and mandated. Without knowing this timing offset/duration to exchange signaling information between the NR module 42 and the LTE module 44, UE behavior in terms of timing by which the vehicle UE 40 is supposed to transmit or receive sidelink V2X messages becomes unpredictable on a RAT that is not directly communicating with the 5G-NR gNB 50. As such, the 5G-NR gNB 50 would not be able to provide dynamic control and management of SL resources to the vehicle UE 40.

In some embodiments of the present disclosure, UE reporting cross-RAT sidelink communication and inter-RAT signaling exchange capabilities is provided to solve the above described issues of the 5G-NR gNB 50 not knowing full capability of sidelink V2X communication of the vehicle UE 40 using more than one RAT and not being able to provide control of SL transmission and reception timing and management of SL resources on a different RAT. Other benefits from adopting the proposed UE capability reporting of some embodiments include:

1. Allowing a network BS to provide more dynamic control, refined, and targeted configurations of SL resources on a different RAT to a UE. Thus, this will lead to better SL system operation performance and saving SL resources.

2. Allowing the network BS to better estimate and align SL resource timing with the UE during dynamic downlink control information (DCI) signaling and radio resource control (RRC) configuration of SL resources.

Figure 2:
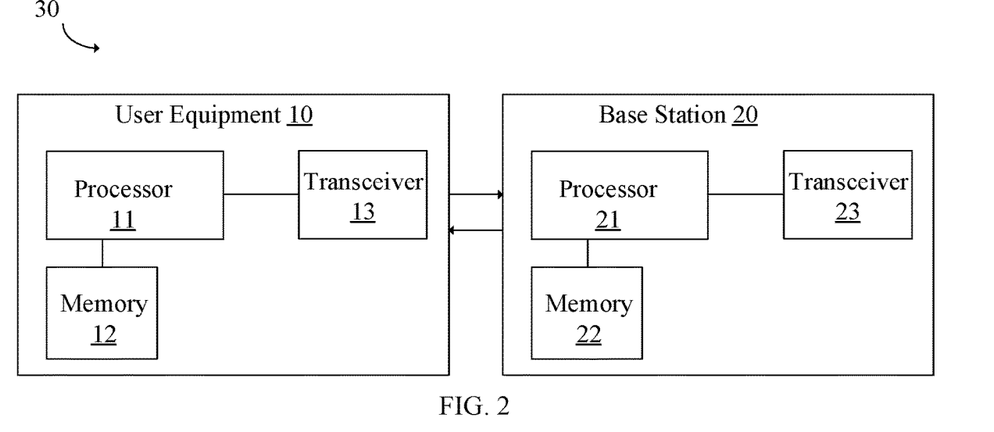
FIG. 2 is a block diagram of a user equipment (UE) for wireless communication and a base station in a communication network system according to an embodiment of the present disclosure.

FIG. 2 illustrates that, in some embodiments, a user equipment (UE) 10 for wireless communication and a base station 20 in a communication network system 30 according to an embodiment of the present disclosure are provided. The communication network system 30 includes the UE 10 and the base station 20. The UE 10 may include a memory 12, a transceiver 13, and a processor 11 coupled to the memory 12, the transceiver 13. The base station 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) long term evolution (LTE) and new radio (NR) Release 16 and beyond. UEs are communicated with each other directly via a sidelink interface such as a PC5 interface. Some embodiments of the present disclosure relate to sidelink communication technology in 3GPP NR release 16 and beyond.

In some embodiments, the processor 11 is configured to control the transceiver 13 to receive, from the base station 20, a sidelink resource configuration signaling for more than one radio access technology (RAT), and control the transceiver 13 to report to the base station 20 that a UE capability supports cross-RAT control. Benefits from adopting the proposed UE capability reporting of some embodiments include: 1. Allowing a network BS to provide more dynamic control, refined, and targeted configurations of SL resources on a different RAT to a UE. Thus, this will lead to better SL system operation performance and saving SL resources. 2. Allowing the network BS to better estimate and align SL resource timing with the UE during dynamic downlink control information (DCI) signaling and radio resource control (RRC) configuration of SL resources.

In some embodiments, the processor 11 is configured to control the transceiver 13 to receive, from the base station 20, an enquiry request related to the UE capability of the UE 10. In some embodiments, the UE capability includes at least one of a UE cross-RAT capability and a UE inter-RAT capability. In some embodiments, the UE cross-RAT capability is configured to use either or both a new radio (NR) RAT and a long term evolution (LTE) RAT for sidelink V2X communication. In some embodiments, an indication of the UE cross-RAT capability configured to use either or both the NR RAT and the LTE RAT for V2X sidelink communication is performed by the transceiver 13 reporting, to the base station 20, a list of UE supported features along with UE supported frequency bands and band combinations for each RAT. In some embodiments, if the list of UE supported features along with UE supported frequency bands and band combinations includes a frequency band dedicated for vehicle-to-everything (V2X) operation for one RAT, the UE 10 supports sidelink V2X communication on the one RAT. In some embodiments, the UE inter-RAT capability is configured to perform processing and signaling exchange between a NR RAT and an LTE RAT.

In some embodiments, the UE inter-RAT capability includes a measure of minimum or maximum time duration/offset that takes from a time point the transceiver 13 receives a signaling information in downlink in one RAT module of the UE 10 to a time point the signaling information is passed to another RAT module of the UE 10. In some embodiments, the processor 11 is further configured to determine whether the UE 10 is in a radio resource control (RRC) connection state after receiving, from the base station 20, the sidelink resource configuration signaling for more than one RAT. In some embodiments, if the UE 10 is in the RRC connection state, the processor 11 controls the transceiver 13 to receive, from the base station 20, the enquiry request related to the UE capability. In some embodiments, if the UE 10 is not in the RRC connection state, the processor 11 establishes an RRC connection to the base station 20 before receiving, from the base station 20, the enquiry request related to the UE capability. In some embodiments, the sidelink resource configuration signaling is conveyed using different system information blocks or dedicated RRC information elements for different RATs.

In some embodiments, the processor 21 is configured to control the transceiver 23 to transmit, to the user equipment (UE) 10, a sidelink resource configuration signaling for more than one radio access technology (RAT), and obtain from the UE 10 that a UE capability supports cross-RAT control. Benefits from adopting the proposed UE capability reporting of some embodiments include: 1. Allowing a network BS to provide more dynamic control, refined, and targeted configurations of SL resources on a different RAT to a UE. Thus, this will lead to better SL system operation performance and saving SL resources. 2. Allowing the network BS to better estimate and align SL resource timing with the UE during dynamic downlink control information (DCI) signaling and radio resource control (RRC) configuration of SL resources.

In some embodiments, the processor 21 is configured to control the transceiver 23 to transmit, to the UE 10, an enquiry request related to the UE capability of the UE 10. In some embodiments, the UE capability comprises at least one of a UE cross-RAT capability and a UE inter-RAT capability. In some embodiments, the UE cross-RAT capability is configured to use either or both a new radio (NR) RAT and a long term evolution (LTE) RAT for sidelink V2X communication. In some embodiments, an indication of the UE cross-RAT capability configured to use either or both the NR RAT and the LTE RAT for V2X sidelink communication is performed by the transceiver receiving, from the UE, a list of UE supported features along with UE supported frequency bands and band combinations for each RAT. In some embodiments, if the list of UE supported features along with UE supported frequency bands and band combinations comprises a frequency band dedicated for vehicle-to-everything (V2X) operation for one RAT, the processor obtains that the UE supports sidelink V2X communication on the one RAT.

In some embodiments, the UE inter-RAT capability is configured to perform processing and signaling exchange between a NR RAT and an LTE RAT. In some embodiments, the UE inter-RAT capability comprises a measure of minimum or maximum time duration/offset that takes from a time point the UE receives a signaling information in downlink in one RAT module of the UE to a time point the signaling information is passed to another RAT module of the UE. In some embodiments, the sidelink resource configuration signaling is conveyed using different system information blocks or dedicated RRC information elements for different RATs.

Figure 3:
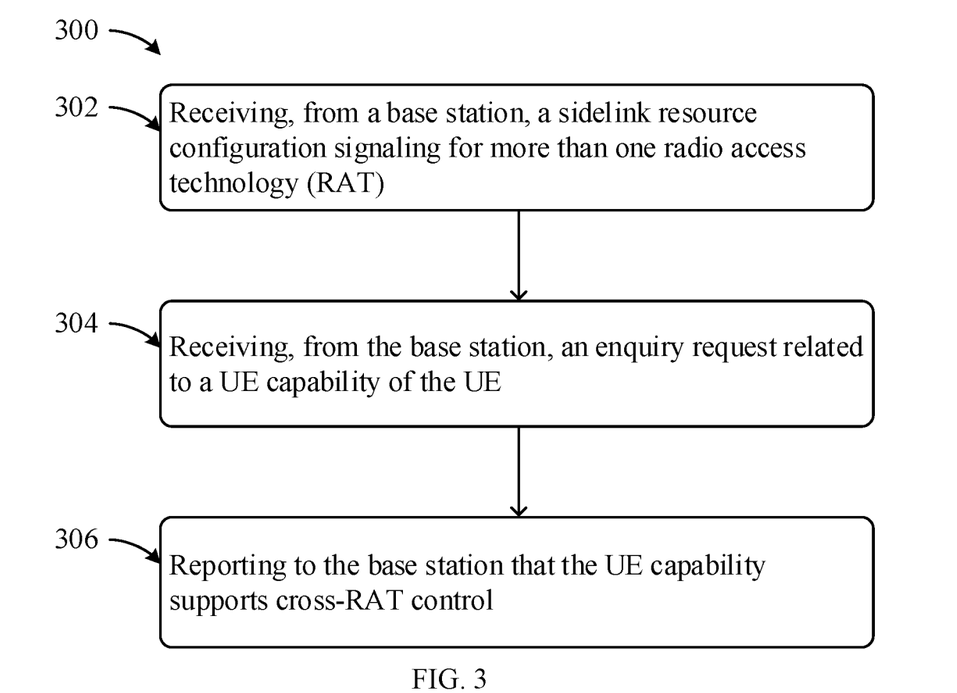
FIG. 3 is a flowchart illustrating a method of wireless communication of a user equipment according to an embodiment of the present disclosure.

FIG. 3 illustrates a method 300 of wireless communication of a UE according to an embodiment of the present disclosure. In some embodiments, the method 300 includes: a block 302, receiving, from a base station, a sidelink resource configuration signaling for more than one radio access technology (RAT), and a block 306, reporting to the base station that the UE capability supports cross-RAT control. Benefits from adopting the proposed UE capability reporting of some embodiments include: 1. Allowing a network BS to provide more dynamic control, refined, and targeted configurations of SL resources on a different RAT to a UE. Thus, this will lead to better SL system operation performance and saving SL resources. 2. Allowing the network BS to better estimate and align SL resource timing with the UE during dynamic downlink control information (DCI) signaling and radio resource control (RRC) configuration of SL resources.

In some embodiments, the method 300 further includes a block 304, receiving, from the base station, an enquiry request related to the UE capability of the UE. In some embodiments, the UE capability includes at least one of a UE cross-RAT capability and a UE inter-RAT capability. In some embodiments, the UE cross-RAT capability is configured to use either or both a new radio (NR) RAT and a long term evolution (LTE) RAT for sidelink V2X communication. In some embodiments, an indication of the UE cross-RAT capability configured to use either or both the NR RAT and the LTE RAT for sidelink V2X communication is performed by the UE reporting, to the base station, a list of UE supported features along with UE supported frequency bands and band combinations for each RAT. In some embodiments, if the list of UE supported features along with UE supported frequency bands and band combinations comprises a frequency band dedicated for vehicle-to-everything (V2X) operation for one RAT, the UE supports sidelink V2X communication on the one RAT.

In some embodiments, the UE inter-RAT capability is configured to perform processing and signaling exchange between a NR RAT and an LTE RAT. In some embodiments, the UE inter-RAT capability comprises a measure of minimum or maximum time duration/offset that takes from a time point the UE receives a signaling information in downlink in one RAT module of the UE to a time point the signaling information is passed to another RAT module of the UE. In some embodiments, the method further includes determining whether the UE is in a radio resource control (RRC) connection state after receiving, from the base station, the sidelink resource configuration signaling for more than one RAT. In some embodiments, if the UE is in the RRC connection state, the UE receives, from the base station, the enquiry request related to the UE capability. In some embodiments, if the UE is not in the RRC connection state, the UE establishes an RRC connection to the base station before receiving, from the base station, the enquiry request related to the UE capability. In some embodiments, the sidelink resource configuration signaling is conveyed using different system information blocks or dedicated RRC information elements for different RATs.

Figure 4:
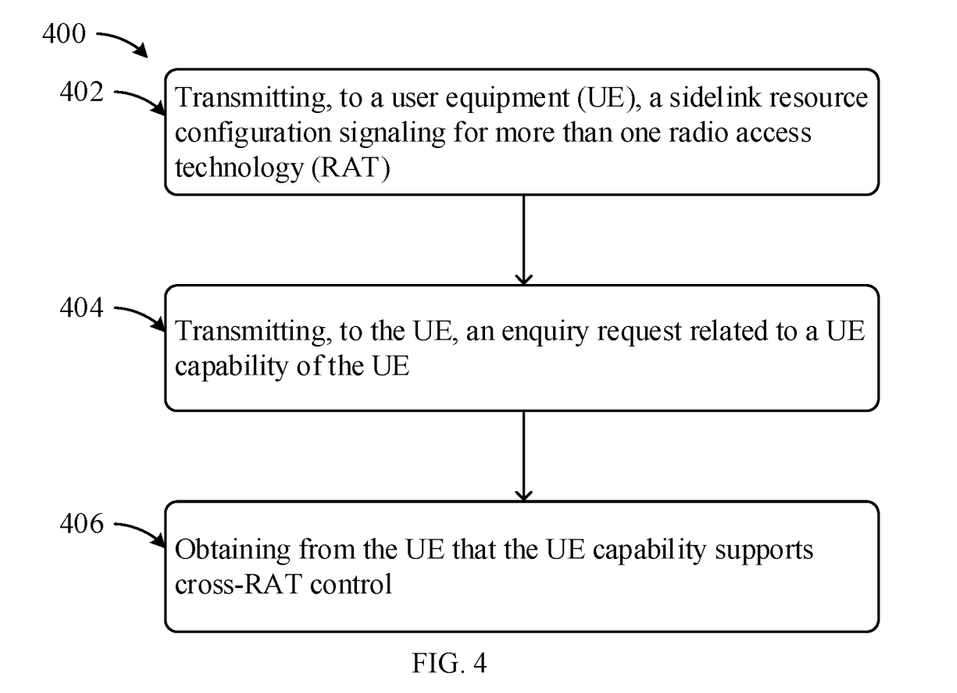
FIG. 4 is a flowchart illustrating a method of wireless communication of a base station according to an embodiment of the present disclosure.

FIG. 4 illustrates a method 400 of wireless communication of a base station according to an embodiment of the present disclosure. In some embodiments, the method 400 includes: a block 402, transmitting, to a user equipment (UE), a sidelink resource configuration signaling for more than one radio access technology (RAT), and a block 406, obtaining from the UE that the UE capability supports cross-RAT control. Benefits from adopting the proposed UE capability reporting of some embodiments include: 1. Allowing a network BS to provide more dynamic control, refined, and targeted configurations of SL resources on a different RAT to a UE. Thus, this will lead to better SL system operation performance and saving SL resources. 2. Allowing the network BS to better estimate and align SL resource timing with the UE during dynamic downlink control information (DCI) signaling and radio resource control (RRC) configuration of SL resources.

In some embodiments, the method 400 further includes a block 404, transmitting, to the UE, an enquiry request related to the UE capability of the UE. In some embodiments, the UE capability comprises at least one of a UE cross-RAT capability and a UE inter-RAT capability. In some embodiments, the UE cross-RAT capability is configured to use either or both a new radio (NR) RAT and a long term evolution (LTE) RAT for sidelink V2X communication. In some embodiments, an indication of the UE cross-RAT capability configured to use either or both the NR RAT and the LTE RAT for sidelink V2X communication is performed by the base station receiving, from the UE, a list of UE supported features along with UE supported frequency bands and band combinations for each RAT. In some embodiments, if the list of UE supported features along with UE supported frequency bands and band combinations comprises a frequency band dedicated for vehicle-to-everything (V2X) operation for one RAT, the base station obtains the knowledge that the UE supports sidelink V2X communication on the one RAT.

In some embodiments, the UE inter-RAT capability is configured to perform processing and signaling exchange between a NR RAT and an LTE RAT. In some embodiments, the UE inter-RAT capability includes a measure of minimum or maximum time duration/offset that takes from a time point the UE receives a signaling information in downlink in one RAT module of the UE to a time point the signaling information is passed to another RAT module of the UE. In some embodiments, the sidelink resource configuration signaling is conveyed using different system information blocks or dedicated RRC information elements for different RATs.

In some embodiments of the present disclosure, a proposed method is provided. In some embodiments, UE reports, to a network BS, a support of sidelink V2X communication using a RAT that is different from the network BS and its capability of inter-RAT module signaling exchange. The UE first determines whether the network BS supports cross-RAT control and resource configuration for sidelink V2X communication by receiving from the network BS an indication or actual configuration such as sidelink resource configuration signaling for more than one RAT.

In some embodiments, if the UE is in an RRC_IDLE state or an RRC_INACTIVE state, the sidelink resource configuration signaling for more than one RAT could be conveyed to the UE via a common RRC signaling in different system information blocks (SIBs). In some embodiments, if the UE is in an RRC_CONNECTED state, the sidelink resource configuration signaling for more than one RAT could be delivered to the UE using a dedicated RRC signaling.

In some embodiments, in details, regarding the UE in an RRC_IDLE state, there is no RRC context. There is no connection between a radio access network (RAN) and a core network (CN). No data transfer may take place as the UE sleeps most of the time to reduce battery consumption. In the downlink, the UE in the RRC_IDLE state may periodically wake up to receive paging messages, if any, from a network. Mobility is handled by the UE through cell re-selection. Uplink synchronization is not maintained and hence the only uplink transmission activity that may take place is random access, to move to an RRC_CONNECTED state. As part of moving to the RRC_CONNECTED state, the RRC context is established in both the UE and the network.

In some embodiments, in details, regarding the UE in an RRC_INACTIVE state, the UE enters into the RRC_INACTIVE state when RRCConnectionRelease is received with suspendConfig. After reception of suspendConfig, the UE stores an access stratum (AS) context, such as security configuration, cell radio network temporary identifier (C-RNTI), physical cell identity (PCI), and cell identity of source primary cell (Pcell). The UE also stores the current RRC configuration. The UE may indicate suspension of an RRC connection to upper layers.

In some embodiments, in details, regarding the UE in an RRC_CONNECTED state, the RRC context is established and all parameters necessary for communication between the UE and a radio access network are known to both entities. UE identity, i.e. C-RNTI, is used for signaling purposes between the UE and the network.

Figure 5:
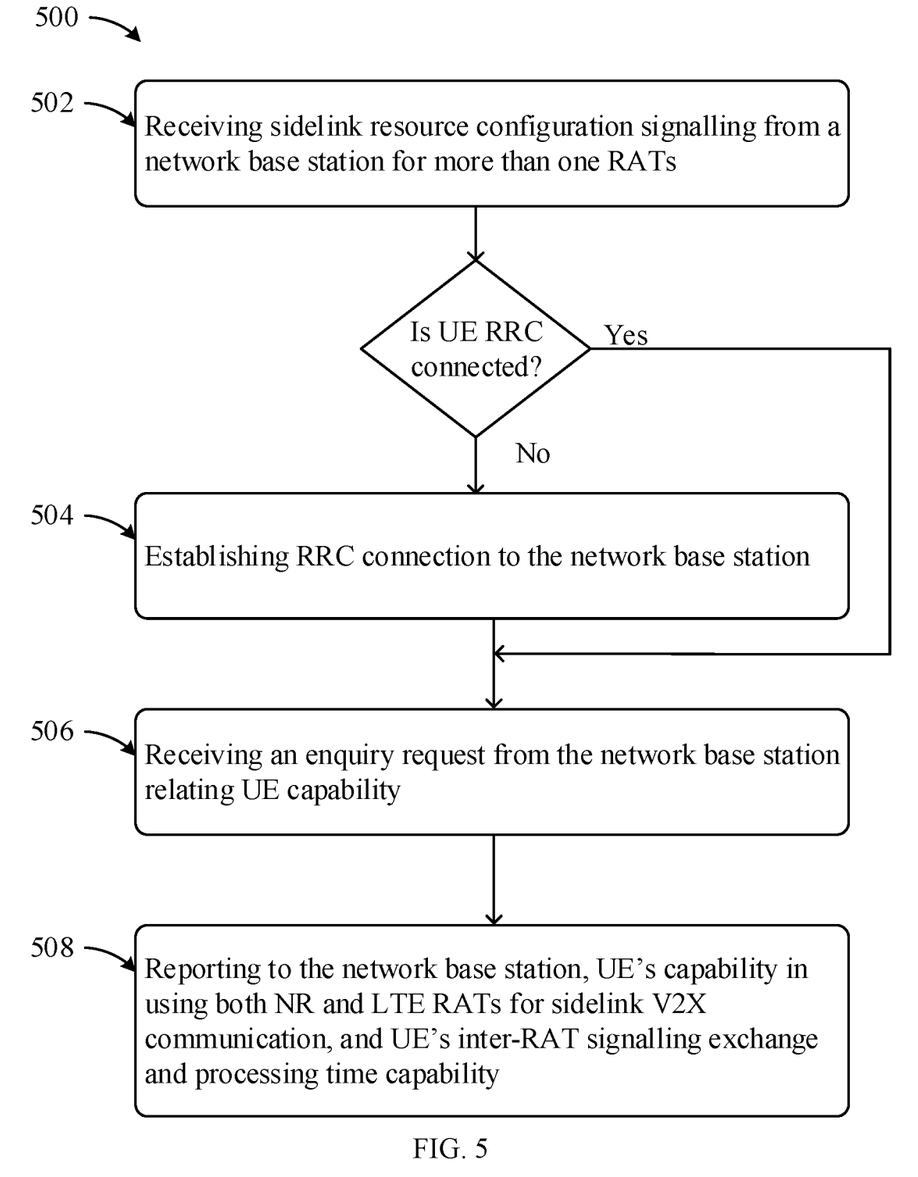
FIG. 5 is a flowchart illustrating a method of UE reporting cross-RAT sidelink communication and inter-RAT signaling exchange capabilities according to an embodiment of the present disclosure.

FIG. 5 is a flowchart illustrating a method of UE reporting cross-RAT sidelink communication and inter-RAT signaling exchange capabilities according to an embodiment of the present disclosure. In reference to a flowchart 500 in FIG. 5, an illustration of a proposed method of UE reporting cross-RAT sidelink communication and inter-RAT signaling exchange capabilities is illustrated. A UE receives from a network BS of sidelink resource configuration signaling for more than one RAT is indicated by a block 502. If the UE is not in an RRC_CONNECTED state, the UE first establishes an RRC connection with the network BS as indicated in a block 504 by sending a RRCSetupRequest message. Once the UE is in the RRC_CONNECTED state, the network BS sends an enquiry request to the UE to report its supported functionalities as indicated in a block 506. Then the UE reports to the BS, as part of UE capability information element, its support for sidelink V2X communication in either or both NR and LTE RATs. At the same time, the UE also reports its capability of inter-RAT signaling exchange and processing time as indicated in a block 508.

In some embodiments, in order for the UE to indicate its support for sidelink V2X communication using either or both NR and LTE RATs, the UE reports its list of supported features along with supported frequency bands and band combinations for each RAT separately to the network BS. If the indicated supporting bands and/or band combinations include the ITS band in 5.9 GHz (i.e., NR Band n47) as part of UE capability reporting for the NR RAT, this means the UE supports NR-V2X sidelink communication. Similarly, if the indicated supporting bands and/or band combinations include the ITS band in 5.9 GHz (i.e., LTE Band 47) as part of UE capability reporting for the LTE RAT, also known as evolved universal terrestrial radio access (EUTRA), this means the UE supports LTE-V2X sidelink communication.

In some embodiments, in order for the UE to indicate its capability for inter-RAT signaling exchange and processing time, this capability could be expressed as a measure of minimum or maximum time duration/offset, or within a range of time duration/offset in number of milli-seconds, slots, subframes, or symbols that would take from a time point the UE receives control signaling information in a downlink in one RAT module (such as one of the NR module 42 and the LTE module 44 in FIG. 1) to a time point signaling information is passed to another RAT module (such as another of the NR module 42 and the LTE module 44 in FIG. 1).

In summary, an aspect of some embodiments provides a method of reporting cross-RAT sidelink communication and inter-RAT module signaling exchange capabilities for a UE. The method includes receiving a sidelink resource configuration signaling for more than one RAT, receiving an enquiry request from a base station related to UE capability, and reporting to the base station as part of UE capability information elements containing UE's cross-RAT capability of using either or both NR and LTE RATs for sidelink V2X communication, and/or UE's inter-RAT capability for processing and signaling exchange between NR and LTE RATs. The method further includes establishing an RRC connection to the base station by sending an RRCSetupRequest if the UE is not already in an RRC_CONNECTED state.

Further, in some embodiments, the sidelink resource configuration signaling is conveyed using different system information blocks or dedicated RRC information elements for different RATs. In some embodiments, an indication of UE's cross-RAT capability of using either or both NR and LTE RATs for sidelink V2X communication is performed by UE reporting its list of supported features along with supported frequency bands and band combinations for each RAT separately to the network BS. If the indicated supporting bands and/or band combinations include a frequency band dedicated for V2X operation as part of UE capability reporting for one RAT, this means the UE supports sidelink V2X communication on the said RAT. In some embodiments, the inter-RAT module signaling exchange capability is a measure of minimum or maximum of time duration/offset, or within a range of time duration/offset in number of milli-seconds, slots, subframes, or symbols that would take from the time point the UE receives control signaling information in the downlink in one RAT module to the time point signaling information is passed to another RAT module.

Commercial interests for some embodiments are as follows. 1. Allowing a network BS to provide more dynamic control, refined, and targeted configurations of SL resources on a different RAT to a UE. Thus, this will lead to better SL system operation performance and saving SL resources. 2. Allowing the network BS to better estimate and align SL resource timing with the UE during dynamic downlink control information (DCI) signaling and radio resource control (RRC) configuration of SL resources. 3. Less signaling message exchange will lead to reduced processing, delay, and power consumption. 4. Being able to support more use cases and types SL communications. Hence, this can provide greater use ability and flexibility. 5. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product.

Figure 6:
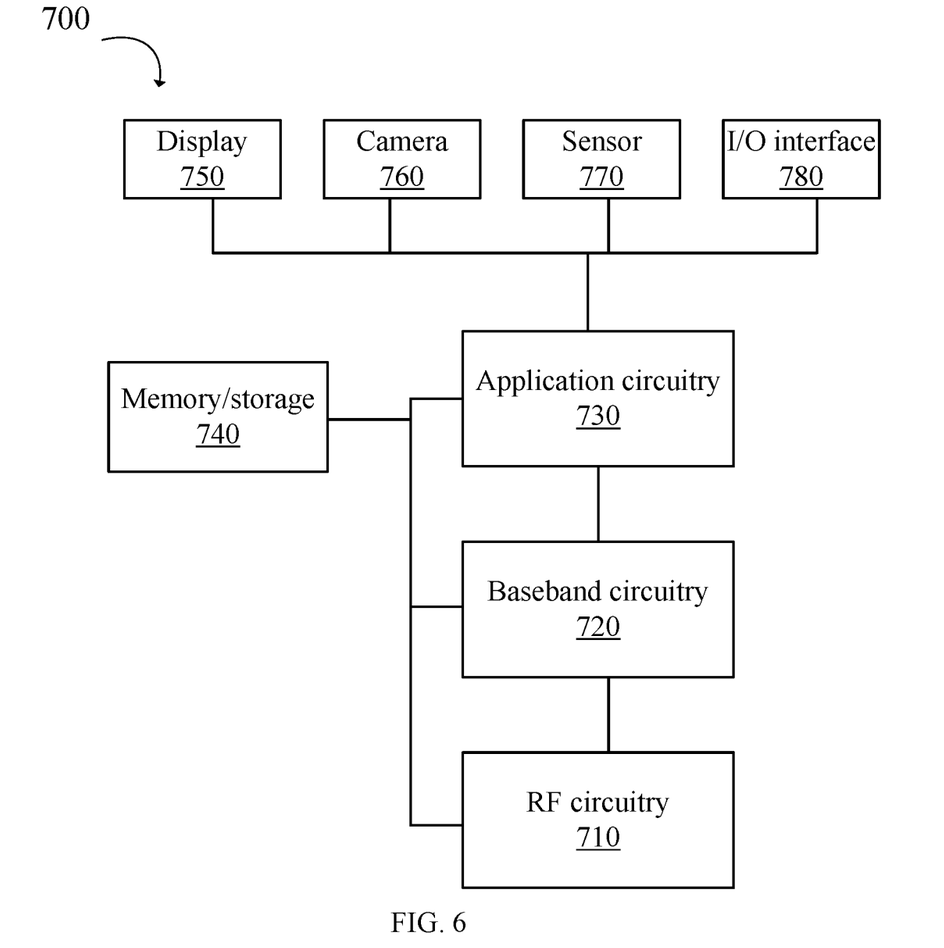
FIG. 6 is a block diagram of a system for wireless communication according to an embodiment of the present disclosure.

FIG. 6 is a block diagram of an example system 700 for wireless communication according to an embodiment of the present disclosure. Embodiments described herein may be implemented into the system using any suitably configured hardware and/or software. FIG. 6 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A user equipment (UE) for wireless communication, comprising:
    a memory;
    a transceiver; and
    a processor coupled to the memory and the transceiver;
    wherein the processor is configured to:
    control the transceiver to receive, from a base station, a sidelink resource configuration signaling for more than one radio access technology (RAT); and
    control the transceiver to report to the base station that a UE capability supports cross-RAT control,
    wherein the UE capability comprises at least one of a UE cross-RAT capability and a UE inter-RAT capability, the UE cross-RAT capability being configured to use either or both a new radio (NR) RAT and a long term evolution (LTE) RAT for sidelink V2X communication, and the UE inter-RAT capability being configured to perform processing and signaling exchange between a NR RAT and an LTE RAT.

2. The user equipment of claim 1, wherein the processor is configured to control the transceiver to receive, from the base station, an enquiry request related to the UE capability of the UE.

3. The user equipment of claim 1, wherein the sidelink resource configuration signaling is conveyed using different system information blocks for different RATs.

4. The user equipment of claim 1, wherein an indication of the UE cross-RAT capability configured to use either or both the NR RAT and the LTE RAT for sidelink V2X communication is performed by the transceiver reporting, to the base station, a list of UE supported features along with UE supported frequency bands and band combinations for each RAT.

5. The user equipment of claim 4, wherein if the list of UE supported features along with UE supported frequency bands and band combinations comprises a frequency band dedicated for vehicle-to-everything (V2X) operation for one RAT, the UE supports sidelink V2X communication on the one RAT.

6. The user equipment of claim 1, wherein the UE inter-RAT capability comprises a measure of minimum or maximum time duration/offset that takes from a time point the transceiver receives a signaling information in downlink in one RAT module of the UE to a time point the signaling information is passed to another RAT module of the UE.

7. The user equipment of claim 1, wherein if the UE is in a radio resource control (RRC) connection state, the processor controls the transceiver to receive, from the base station, the enquiry request related to the UE capability.

8. A method of wireless communication of a user equipment, comprising:
    receiving, from a base station, a sidelink resource configuration signaling for more than one radio access technology (RAT); and
    reporting to the base station that a UE capability supports cross-RAT control,
    wherein the UE capability comprises at least one of a UE cross-RAT capability and a UE inter-RAT capability, the UE cross-RAT capability being configured to use either or both a new radio (NR) RAT and a long term evolution (LTE) RAT for sidelink V2X communication, and the UE inter-RAT capability being configured to perform processing and signaling exchange between a NR RAT and an LTE RAT.

9. The method of claim 8, further comprising receiving, from the base station, an enquiry request related to the UE capability of the UE.

10. The method of claim 8, wherein the sidelink resource configuration signaling is conveyed using different system information blocks for different RATs.

11. The method of claim 8, wherein an indication of the UE cross-RAT capability configured to use either or both the NR RAT and the LTE RAT for sidelink V2X communication is performed by the UE reporting, to the base station, a list of UE supported features along with UE supported frequency bands and band combinations for each RAT.

12. The method of claim 11, wherein if the list of UE supported features along with UE supported frequency bands and band combinations comprises a frequency band dedicated for vehicle-to-everything (V2X) operation for one RAT, the UE supports sidelink V2X communication on the one RAT.

13. The method of claim 8, wherein the UE inter-RAT capability comprises a measure of minimum or maximum time duration/offset that takes from a time point the UE receives a signaling information in downlink in one RAT module of the UE to a time point the signaling information is passed to another RAT module of the UE.

14. The method of claim 8, wherein if the UE is in an RRC connection state, the UE receives, from the base station, the enquiry request related to the UE capability.

15. A computer readable storage medium, in which a computer program is stored, wherein the computer program causes a computer to execute the method of claim 8.

16. A computer program product, comprising a computer program, wherein the computer program causes a computer to execute the method of claim 8.

17. A computer program, wherein the computer program causes a computer to execute the method of claim 8.

* * * * *